(12) United States Patent
Drewniok et al.

(10) Patent No.: US 6,807,733 B2
(45) Date of Patent: Oct. 26, 2004

(54) METHOD AND DEVICE FOR FOAMED IN PLACE ELECTRICAL SYSTEMS

(75) Inventors: Daniel Drewniok, Frankfurt am Main (DE); Andreas Schroeder, Mommensheim (DE)

(73) Assignee: Meritor Automotive GmbH, Frankfurt (DE)

( * ) Notice: Subject to any disclaimer, the term of this patent is extended or adjusted under 35 U.S.C. 154(b) by 202 days.

(21) Appl. No.: 09/740,134

(22) Filed: Dec. 18, 2000

(65) Prior Publication Data

US 2001/0004561 A1 Jun. 21, 2001

(30) Foreign Application Priority Data

Dec. 18, 1999 (DE) .......................... 199 61 233

(51) Int. Cl.[7] .............................................. H01R 43/00
(52) U.S. Cl. .......................... 29/858; 29/857; 439/462; 439/589
(58) Field of Search .......................... 29/858, 857, 861, 29/862; 439/274–275, 587–589

(56) References Cited

U.S. PATENT DOCUMENTS 4,454,381 A * 6/1984 Ito et al. ..................... 174/151

* cited by examiner

Primary Examiner—Rick Kiltae Chang
(74) Attorney, Agent, or Firm—Carlson, Gaskey & Olds

(57) ABSTRACT

Method of sealing plug-in connection elements of electrical line systems during the foaming in place of such elements that are to be foamed in place in components, in which method the entry point of the electrical lead into the plug-in connection element is sealed by a closure part under the pressure of the foam to be introduced. The closure part preferably includes an elastically deformable material and has either lips which lie against each other and enclose the lead or a form corresponding to the opening in the plug-in connection element that widens outwards for receiving the lead.

11 Claims, 3 Drawing Sheets

US 6,807,733 B2

METHOD AND DEVICE FOR FOAMED IN PLACE ELECTRICAL SYSTEMS

RELATED APPLICATIONS

This patent application claims priority to German Patent Application No. 199 61 233.1 filed Dec. 18, 1999.

BACKGROUND OF INVENTION

The present invention relates to a method and apparatus for sealing plug-in connection elements of electrical line systems, and in particular, the invention relates to a method and apparatus for sealing the plug-in connection elements during a foaming process.

If it is wished to foam line systems in place in components, such as the door modules for motor vehicles for example, plug-in connection elements are required in order to allow later connection of the loads concerned. These are preferably likewise foamed in place in such a way that only the opening in this connection element into which the corresponding part concerned is later inserted remains freely accessible. During foaming in place there is then the risk of the initially very liquid foam being easily able to penetrate through the opening in the body of the plug-in connection element, for leading through the leads, into the body and consequently rendering the entire arrangement unusable.

A procedure for the sealing of an electric cable system plug-in connector element to be attached to a component, is generally known in the art from DE 30 48 008 C2, where a jacket is molded and a tapered neck formed. This requires additional operational steps.

This risk is to be countered by the method according to the invention and the device to be used for this method according to the invention.

The problem which consequently arises according to the invention is solved by the entry point of the electrical conductor into the plug-in connection element being sealed by a closure part under the pressure of the foam to be introduced. This closure part may have two flexible lips, which lie against each other and enclose the electrical lead, or comprise a component which corresponds to the outwardly widening opening for the insertion of the leads. Both solutions are explained in more detail with reference to the attached drawing.

SUMMARY OF THE INVENTION AND ADVANTAGES

The present invention relates to a method of sealing plug-in connection elements of electrical line systems during the foaming in place of such elements that are to be foamed in place in components, in which method the entry point of the electrical lead in to the plug-in connection element is sealed by a closure part under the pressure of the foam to be introduced. The closure part preferably includes and elastically deformable material and has either lips which lie against each other and enclose the lead or a form corresponding to the opening in the plug-in connection element that widens outwards for receiving the lead.

BRIEF DESCRIPTION OF THE DRAWINGS

In these drawings:

FIG. 1 shows a first embodiment of the invention, with a plug-in connection element (1) in cross section, the design of which may be formed as desired according to the intended use and which is foamed in place in the foam (2). This plug-in connection element has on the one hand contacts (14) (only indicated) for the later connection of a load and on the other hand the connection to a lead (3), which may comprise a single line or a plurality of single electrical lines of a known type (round-conductor ribbon, flat-conductor ribbon, webbed ribbon conductor or the like). This lead (3) is led through the closure part (4), which has two flexible lips which lie against each other and enclose the lead (3). The closure part (4) may be fitted onto the body of the plug-in connection element (see FIG. 20, moulded onto the body or connected to it in another suitable way, or if the body is of a suitable material may be produced integrally with it.

The design of the lips lying against each other depends on the type of leads (3) to be led through. FIG. 3 shows one embodiment in plan view, in which the lead (3) is a webbed ribbon conductor. In this case, the lip parts (5a, 5b), which meet along the line (6), have cutouts (7) adapted to the cross section of the individual wires of the webbed ribbon conductor.

If a plug-in connection element with a closure part (4) designed in such a way is foamed in place in a component, such as a car door for example, the expanding foam presses the flexible lips (5a, 5b) against each other and in the direction of the body of the plug-in connection element (1) and brings about a sealed termination, which prevents foam from penetrating into this body.

Figure 1:
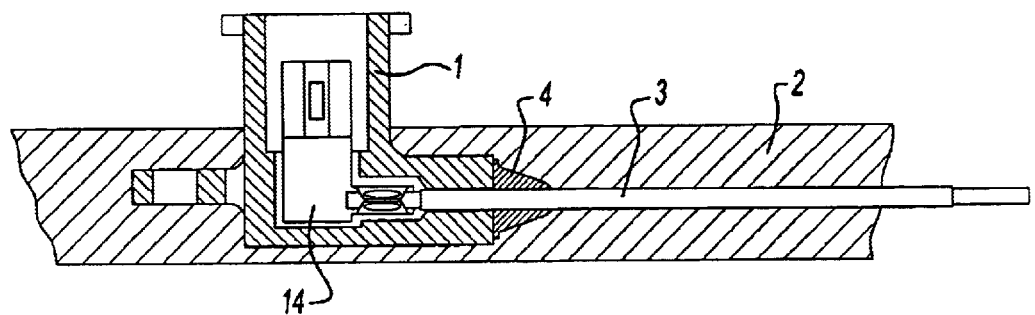
FIG. 1 shows an embodiment of the closure part with sealing lips
Figure 2:
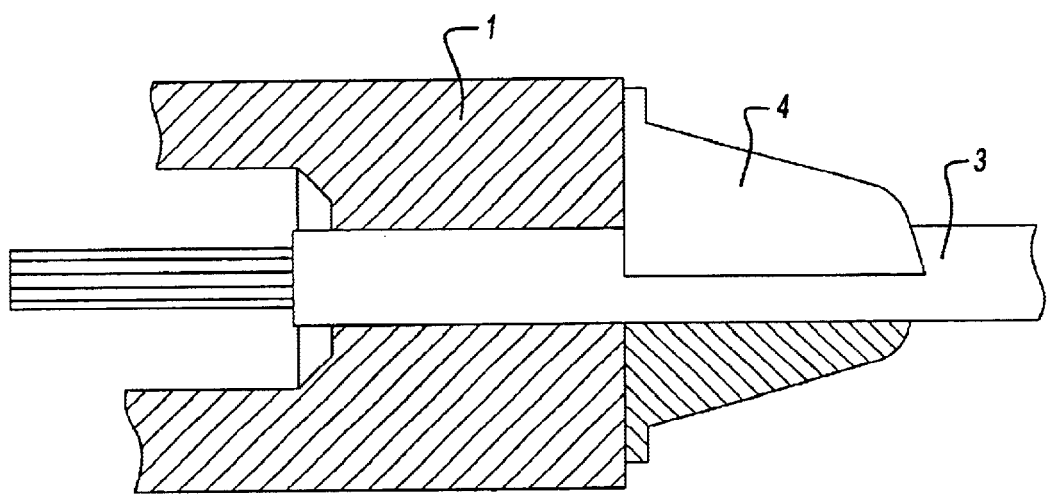
FIG. 2 shows an enlarged partial view of FIG. 1
Figure 3:
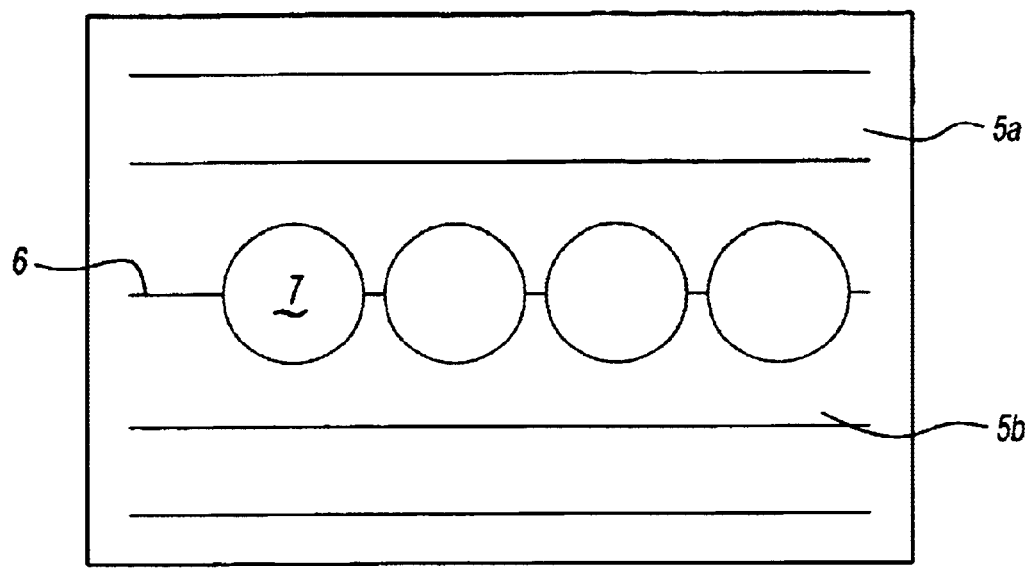
FIG. 3 shows a plan view of the closure part according to one embodiment
Figure 4:
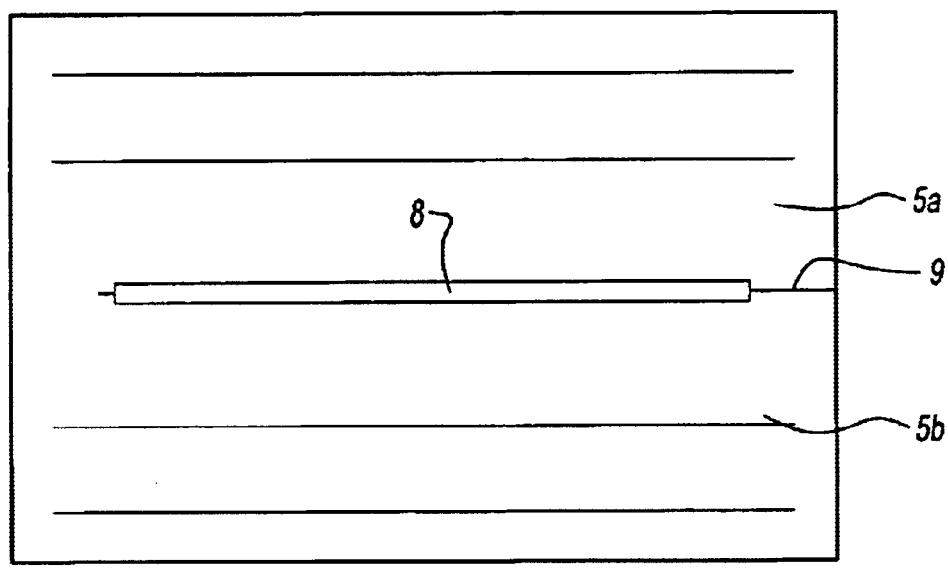
FIG. 4 shows a plan view of the closure part according to another embodiment

FIG. 4 shows another design, for the case in which the lead (3) comprises a flat conductor. Then, the lips have to leave only a narrow gap (8), the insertion of the flat conductor then preferably being made easier by one side of the closure part (4) having a cut opening (9).

Figure 5:
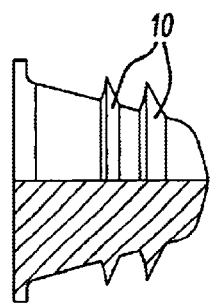
FIG. 5 shows a modification of the closure part of FIG. 3 or 4

The pressure applied by the foam can be intensified by providing surface-area enlargements on the lips, in the form of lugs or additional ridges (10), as FIG. 5 shows by way of example.

Figure 6:
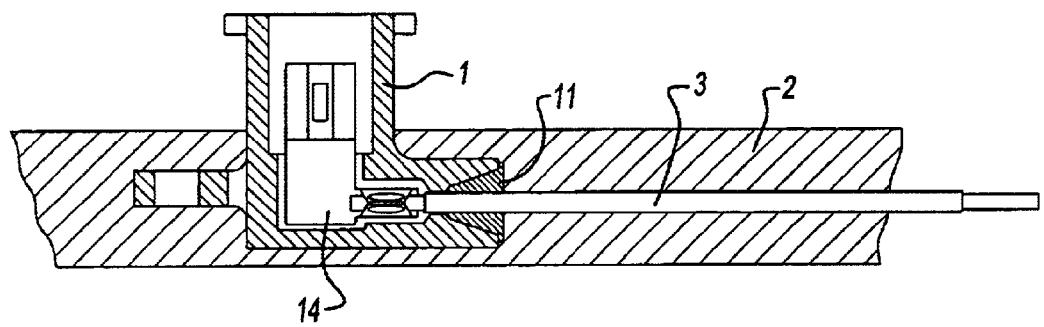
FIG. 6 shows another embodiment with a sealing plug-like closure part.
Figure 7:
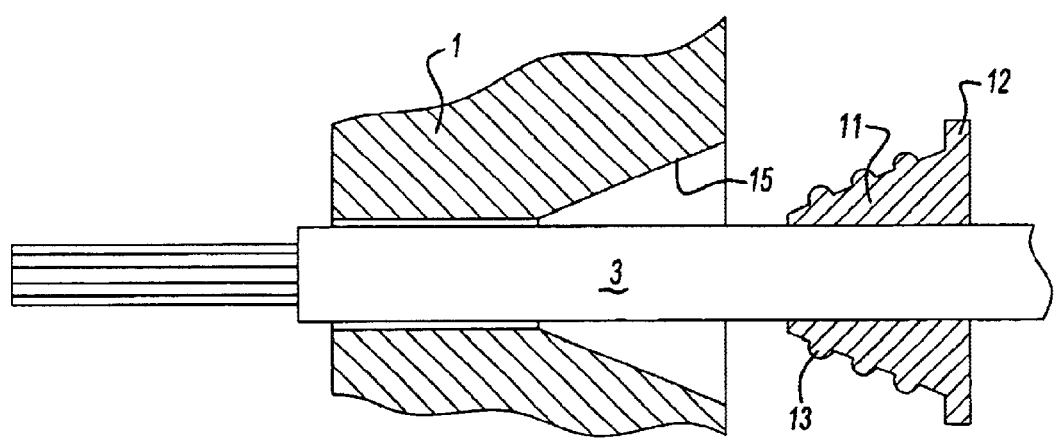
FIG. 7 shows and embodiment of the closure part with circular cam strips.

Another embodiment of the solution according to the invention is represented in FIG. 6, in which the opening (15) of the plug-in connection element (1) through which the lead (3) is inserted is widened outwards in cross section in a funnel-shaped manner and the closure part (11), consisting of a flexible material, has a corresponding, tapering form, as FIG. 6 in particular clearly shows. Depending on the type of lead (4) to be inserted, this closure part (11 may adopt a wide variety of forms. For example, in the case of a single line, the closure part may have a conical shape, while for a flat conductor ribbon an elongated design that is rectangular in cross section perpendicularly with respect to the direction of the line, with tapering side and end faces, can be used. The opening (15) in the plug-in connection element, widening in a funnel-shaped manner, is then correspondingly designed.

The sealing effect can be intensified by providing the closure part with a sealing collar (12), which can come to bear in a sealed manner on the end face of the plug-in connection element. The sealing between the closure part (11) and the lead (3) can be improved if peripheral cam strips (13) are provided on the closure part. This achieves the effect that the flexible closure part (11) is deformed in the direction of the lead when, during foaming in place, the closure part is pressed into the opening (15) in the plug-in connection element by the pressure of the foam.

A wide variety of materials can be used for the closure part according to both embodiments described above and all modifications that are obvious to a person skilled in the art, provided that they are adequately flexible or can be deformed under the pressure of the expanding foam.

What is claimed is:

1. A method of sealing plug-in connection elements of electrical line systems during foaming in place of the elements that are to be foamed in place in components, comprising the steps of:
   a) providing a plug-in connection element with an opening;
   b) arranging an elastically deformable closure part with an electrical lead proximate to the opening;
   c) forcing the elastically deformable closure part into the opening of the plug-in connection element under the pressure of foam; and
   d) sealing the elastically deformable closure part in the opening of the plug-in connection element under the pressure of foam.

2. The method according to claim 1, wherein the closure part has two flexible lip parts which lie against each other and enclose the electrical lead.

3. The method to claim 1, wherein the closure part comprises a plug which encloses the conductor and tapers conically toward the plug-in connection element.

4. The method according to claim 1, wherein the closure part is formed integrally with a body of the plug-in connection element.

5. The method according to claim 1, wherein the closure part is connected to a body of the plug-in connection element by moulding.

6. The method according to claim 1, wherein the closure part is fitted in a sealed manner onto a body of the plug-in connection element.

7. The method according to claim 1, wherein the closure part includes flexible lips having surface area enlargements near an end of the flexible lips.

8. The method according to claim 1, wherein the opening in a body of the plug-in connection element tapers outward for receiving a corresponding taper on the closure part.

9. The method according to claim 8, wherein the closure part has a collar on its end opposite the opening.

10. The method according to claim 8, wherein the closure part has a plurality of peripheral beads.

11. The method according to claim 1, wherein the plug-in connection element includes a body with a portion of the body having a contact in electrical contact with the electrical lead, the portion of the body extending through the foam with the rest of the body surrounded by the foam.

* * * * *